(12) United States Patent
Zeller et al.

(10) Patent No.: US 10,239,126 B2
(45) Date of Patent: Mar. 26, 2019

(54) TOOL ASSEMBLY INTERFACE

(71) Applicant: BENZ GMBH WERKZEUGSYSTEME, Haslach (DE)

(72) Inventors: Christoph Zeller, Haslach (DE); Wilhelm Giessler, Steinach (DE); Andreas Neumann, Gengenbach (DE); Simon Ganter, Elzach (DE); Thomas Geisselmann, Fischerbach (DE)

(73) Assignee: BENZ GMBH WERKZEUGSYSTEME, Haslach (DE)

( * ) Notice: Subject to any disclaimer, the term of this patent is extended or adjusted under 35 U.S.C. 154(b) by 0 days.

(21) Appl. No.: 15/350,043

(22) Filed: Nov. 12, 2016

(65) Prior Publication Data

US 2017/0209938 A1  Jul. 27, 2017

Related U.S. Application Data

(63) Continuation-in-part of application No. PCT/DE2015/000216, filed on May 5, 2015.

(30) Foreign Application Priority Data

May 15, 2014  (DE) ........................ 10 2014 007 056

(51) Int. Cl.
*B23B 31/113*  (2006.01)
*B23B 31/10*  (2006.01)
(Continued)

(52) U.S. Cl.
CPC ............ *B23B 31/113* (2013.01); *B23B 31/10* (2013.01); *B23B 31/003* (2013.01); *B23B 31/02* (2013.01);
(Continued)

(58) Field of Classification Search
CPC ... B23B 31/113; B23B 2231/52; B23B 31/10; B23B 31/003; B23B 31/02; B23B 2231/12; Y10T 279/17888; Y10T 403/7007

See application file for complete search history.

(56) References Cited

U.S. PATENT DOCUMENTS 3,444,781 A * 5/1969 Hilliard ................. B23B 31/028
                                                          279/105.1
5,667,228 A * 9/1997 Fabris .................... B23B 31/113
                                                          279/143

(Continued)

FOREIGN PATENT DOCUMENTS

DE   102010026129 A1 * 1/2012  ........... B23B 31/113
WO   WO 2010089405 A1 * 8/2010  ........... B23B 31/005

*Primary Examiner* — Daniel Howell
*Assistant Examiner* — Paul M Janeski
(74) *Attorney, Agent, or Firm* — Klaus J. Bach (57) ABSTRACT

In an interface structure comprising a first assembly and a second assembly wherein the first assembly includes a cavity having a truncated cone-like section, a stop surface effective in the axial direction and a second assembly including a trunnion with a truncated cone-like section for abutment on the truncated cone-like sleeve section of the first assembly and an abutment surface for contacting the abutment surface of the first assembly, between the cavity and the trunnion a bayonet-like locking structure is provided in the interface structure whereby handling with a high repetition accuracy with regard to the position of the assemblies to be joined is ensured.

8 Claims, 5 Drawing Sheets

(51) Int. Cl.
*B23B 31/00* (2006.01)
*B23B 31/02* (2006.01)

(52) U.S. Cl.
CPC ....... *B23B 2231/12* (2013.01); *B23B 2231/52* (2013.01)

(56) References Cited

U.S. PATENT DOCUMENTS

| | | | |
|---|---|---|---|
| 6,974,287 B2 * | 12/2005 | Neumeier | B23B 31/117 279/137 |
| 8,360,699 B2 * | 1/2013 | Stojanovski | B23C 5/10 279/89 |
| 9,644,686 B2 * | 5/2017 | Geisselmann | B23B 31/113 |
| 2011/0194907 A1 * | 8/2011 | Guy | B23B 31/113 409/234 |

* cited by examiner

TOOL ASSEMBLY INTERFACE

This is a Continuation-In-Part application of pending international patent application PCT/DE2015/000216 filed May 5, 2015 and claiming the priority of German patent application 10 2014 007 056.5 filed May 15, 2014.

BACKGROUND OF THE INVENTION

The invention resides in an interface structure of a first—a tool or tool holder supporting—assembly and a second—a machining element supporting—assembly wherein the first assembly has a cavity with an at least a truncated cone- or cylinder-shaped section and a support surface or contact area which is effective in axial direction and wherein the second assembly is provided with a trunnion which has a cone- or truncated cone-shaped or cylindrical section for abutment on the cone- or truncated cone-shaped or cylindrical section of the first assembly and at least one in axial direction effective contact area or support surface for contacting the support surface or contact area of the first assembly.

Such an interface structure is known from DE 10 2010 026 129 B4. In the cavity of the first assembly, an annular shift lever element is arranged so as to be longitudinally movable or pivotable. The shift lever element has at least an engagement element for connection to the second assembly. The second assembly has at least one engagement element which, by a pivot movement of the second assembly, can be moved into engagement with the engagement element of the shift lever element. The size of an interface area with such a shift lever element is highly suited for relatively large interface area. However, with further miniaturizing of the interface area, the rigidity of the shift lever element decreases rapidly.

It is the object of the present invention to provide for a tool assembly interface structure between a first assembly and a second assembly which—in spite of a small interface area—ensures with each tool change simple handling with a high repetition accuracy concerning the position of the second assembly with regard to the first assembly.

The object is solved with the features of claim 1. Between the cavity and the trunnion-like projection there is a bayonet-like lock with at least one web provided on the trunnion-like projection. In the first assembly, a clamping element is arranged whose front end engages during clamping one of the webs.

SUMMARY OF THE INVENTION

With the invention, a second assembly is clamped to the first assembly so as to be locked rotationally in a way that it can be engaged repeatedly with high accuracy. To this end, the two assemblies forming the interface area are tightly clamped together. Since the assemblies are very small components—in the exemplary embodiments their diameter is only 22 mm—small, sensitive mechanical drive components cannot be used. The few parts used need to have a high shape rigidity so that the clamping forces are maintained during the operation.

The solution resides in a bayonet-like locking structure. The second assembly which can be inserted into the first assembly carries radially projecting elements such as webs, bolts or pins. The first assembly has corresponding recesses or engagement structures by which the projecting elements are engaged when the two assemblies are coupled by at least one translatory and/or rotational movement. The projecting elements are engaged in the recesses or engagement structures for example by way of point- line- or areal contacts. The first assembly is further provided with a clamping element which supports the coupling movement and/or locks the engagement state. With the, for example, manually operated clamping element also the decoupling procedure may be initiated.

The projecting elements and the recesses or engagement structures are so arranged relative to one another that, during disengagement, the second assembly cannot just fall out of the first assembly with the de-clamping or release of the coupling. For the complete separation of the assemblies, an additional handling step is required.

In the exemplary embodiments, the first assembly is a rotating spindle head of a tool changing unit. The second assembly comprises a toolholder supporting a tool. The first assembly may, of course, also be a non-rotating tool carrier as it is used for example as a cutting tool holder of a top carriage of a conventional turning lathe. The second assembly in this case is the tool bit arranged in a toolholder serving as tool or tool bit carrier.

Further particular features of the invention are apparent from the following description of schematically shown embodiments in connection with the accompanying drawings.

BRIEF DESCRIPTION OF THE DRAWINGS

It is shown in

DESCRIPTION OF A PARTICULAR EMBODIMENT

Figure 3:
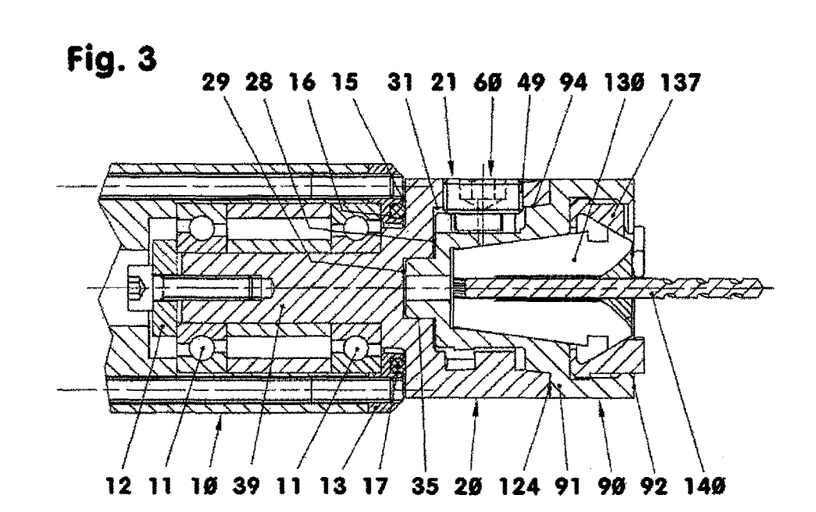
FIG. 3: a longitudinal cross-sectional view of an interface area which is supported in the housing of a tool holder arrangement.

FIG. 3 shows the front part of a tool unit. A spindle head 20 forming a first construction group of a modular interface area projects from the housing 10 of the tool unit. A tool holder 90 forming a second construction group of the modular interface area is disposed exchangeably in the spindle head 20. The tool holder 90 carries the tool 140, for example, a spiral drill.

The housing 10 and the cover 13 support the rear end of the spindle head 20 in two detachable ball journal bearings 11, which are arranged in an O-arrangement. The outer rings of the ball journal bearings 11 are axially fixed between the housing 10 and the cover 13. The inner rings of the ball journal bearings, which are supported on the shaft 39 of the spindle head 20, are axially clamped between a spindle head shoulder 25 and a support plate 12 which is screwed axially centrally onto the spindle head 20 and centered in the inner ring of the ball journal bearing 11 contacted thereby.

The cover 13 of the housing 10 is provided at its mostly planar front side 15 with an annular groove 16 in which a sealing ring 17 is accommodated which abuts the rear planar axial collar face 26 of the spindle head 20.

From the spindle head 20 a tubular clamping mechanism section 21 projects from the housing 10. This clamping mechanism section 21 has for example a cylindrical outer wall 22, see FIG. 1, a profiled inner wall 31—as part of a cavity accommodating a tool holder 90—and, for example, planar, front surface 124. The depth of the clamping mechanism section 21 with a spindle head 20 with for example an outer diameter of 22 mm is for example 11.7 mm, whereas its average wall thickness is for example 4 mm. The inner wall 31 ends for example ahead of a planar intermediate end surface 28 from which a cylindrical bore 35 extends. The bore 25 has for example a diameter of 6 mm. The depth of the bore 35 is about 2.8 mm. The bore 35 ends in a planar bottom surface 29.

Figure 21:
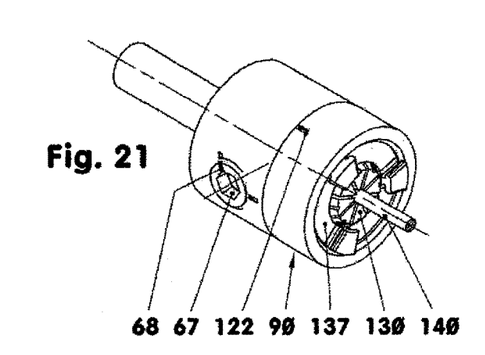
FIG. 21: a perspective view of the interface area with firmly engaged tool.

The clamping mechanism section 21 of the spindle head 20 has for example a radial threaded bore 49, see FIG. 21. As shown in FIG. 3, the threaded bore 49 has for example the fine thread M 8×0.5.

Figure 5:
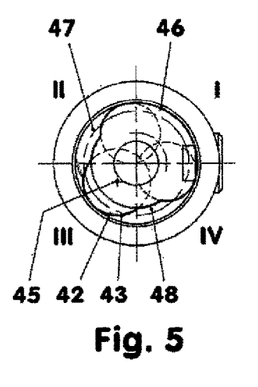
FIG. 5: a bottom view of the spindle head.

The inner wall 31 is formed by a bore whose cylindrical wall has an inner diameter of for example 12 mm, see FIG. 5. In the third quadrant, according to FIG. 5, there is a first cut-out 42 with a cylindrical wall 43, which extends completely over the third quadrant. A quadrant is a mathematical term. It is a section in a drawing plane which is delimited by two coordinate axes. Four quadrants extend over 360 annular degrees, wherein the zero degree mark is in the positive area of the abscissa of the coordinate system. The angular degree count is counter-clockwise.

The first cut-out 42 of the inner wall 31 has a radius of for example 4.5 mm. The centerline 45 is spaced from the center line 59 by 3.6 mm. As shown in FIG. 5, it is disposed in the third quadrant at an angular degree of 225. A second cut-out 46 is disposed opposite first cutout 42. It has the form of a crescent-shaped longitudinal opening. The center axis of the longitudinal opening is disposed on a circle with a radius of 4.1 mm. The opening diameter of the longitudinal opening is 4 mm. The second cut-out 46 extends over the area of the full longitudinal width of for example 116.6 annular degrees. Both cut-outs (42, 46) extend parallel to the center line 59 between the planar bottom surface 28 and the outer cone section 120. In the second quadrant between the cutouts 42, 46, the groove opening 47 is provided. A further cutout, that is the blocking groove 48, is arranged between the cutouts 46, 42 in the fourth quadrant.

Figure 22:
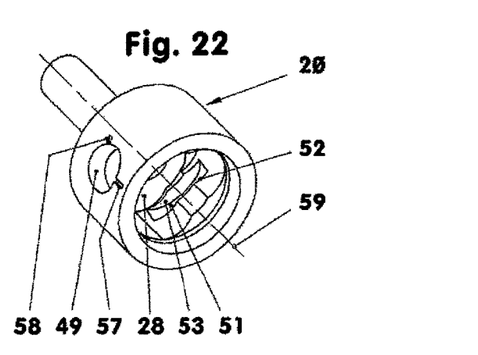
FIG. 22: a perspective view of the spindle head.

In the second quadrant in accordance with FIG. 5, there is between the first cut-out 42 and the second cut-out 46 a holding groove 51, see also FIG. 22. The holding groove 51 has a clamping flank 52 arranged opposite the intermediate end surface area 28. It is for example a section of a threaded nut flank with a pitch of for example 6 mm. In the exemplary embodiment, it is a part of a rectangular thread. The holding groove 51 may also be part of a trapezoidal, a saw-tooth, a round or a metric thread or similar holding structure. The holding groove 51 extends over about 60 angular degrees of the circumference of the inner wall 31. The maximum holding groove depth is for example 2.1 mm. In the exemplary embodiment, the holding groove 51 has a load-free flank 53 which is arranged for example 3 mm away from the clamping flank 52. Depending on circumstances, the holding groove 51 without flank 53 may extend up to the intermediate end surface 28.

As shown in FIG. 22, the holding groove 51 is machined into the spindle head 20 via the cavity 30 so that the outer wall 22 remains closed. However, the holding groove 51 may also be machined from the outside through the outer wall 22.

Figure 7:
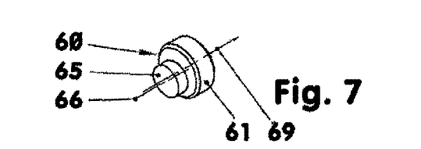
FIG. 7: a perspective view of the eccentric screw of FIG. 3.
Figure 8:
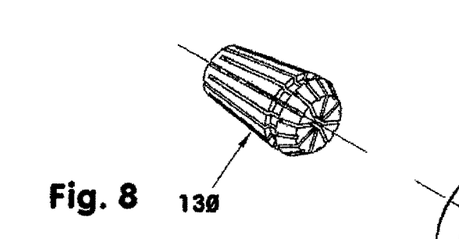
FIG. 8: a perspective view of the clamping structure of FIG. 3.
Figure 9:
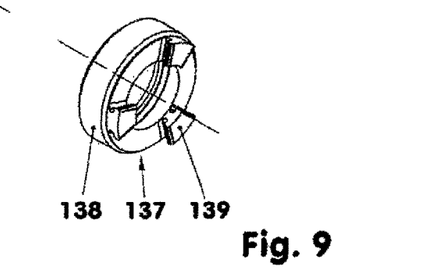
FIG. 9: a perspective view of the clamping screw ring of FIG. 3.

Into the threaded bore 49 of the clamping mechanism section 21, an eccentric screw 60 provided with an outer thread is threaded. It has a front end which extends into the cavity 30 and is in the form of an eccentric pin 65, see FIG. 7. The latter has a cylindrical outer surface and a diameter of for example 4.8 mm. The outer surface may also be curved at least in areas thereof or it may also be spherically curved. The eccentricity of the eccentric pin 65 is for example 0.875+0.1 mm. The pivot axis of the eccentric screw 60 is the center line 69 thereof.

Figure 2:
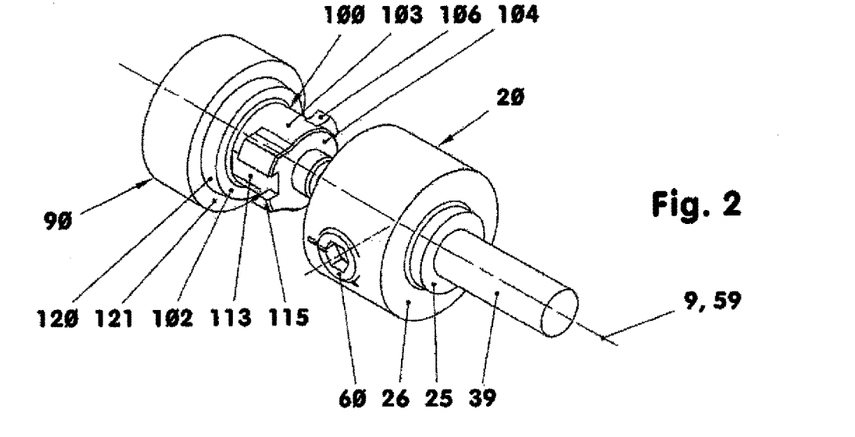
FIG. 2: the same as FIG. 1 but turned by 180°.

The eccentric pin-free front side of the eccentric screw 60 has a tool accommodation cavity 67, see FIG. 21, with a for example hexagonal inner cross-section. Between the tool accommodation cavity 67 and the outer thread of the eccentric screw 60, there is a radially extending groove 68 or notch for marking the position of the eccentric screw 61, see FIG. 2. As shown in FIG. 2, the groove 68 is provided below the tool accommodation cavity 67.

The tool 90 is inserted into the cavity 30. The tool holder has a flange section 91, see FIG. 11, which is provided with a trunnion 100. This trunnion 100 comprises an outer cone section 120, a locking section 101 and an end section 127. The almost disc-like flange section 91 for example has in the exemplary embodiment a cylindrical outer surface whose diameter here is for example slightly smaller than the adjacent outer diameter of the spindle head 20. At the front, the flange section 91 has for example a planar front face 92 in the center of which a cavity 95 for accommodating a clamping plier, another tool holder component or a tool is provided. At the rear, the flange section 91 ends with an abutment surface 121 in the form of a planar flange surface. The outer surface of the flange section 91 is provided near the abutment surface 121, see FIG. 21, with a marker groove 122.

The clamping plier cavity 95 in the front face 92 comprises essentially an inner thread section 96 and an inner cone section 97. The inner thread section 96 having a depth of for example 6.5 mm is provided for example with a fine thread M18×1. The inner cone section 97 has a maximum inner diameter of 11 mm and a cone angle of for example 16 angular degrees. It has a depth of 12 mm. It leads into a central threaded throughbore 98 which is for example 4.5 mm long and provided with an M3 thread. Alternately, a throughbore may be provided in place of the threaded throughbore.

The backside of the flange section 91 has a planar front surface 121, which serves as an abutment surface for contacting the spindle head 20. The rear surface 93 is divided into different zones by straight or non-straight grooves. The fittingly machined front surface areas 24 and 121 may be frustroconical or spherically curved. The cone angle would then be between 170 and 190 angular degrees while the curvature radius would be larger than 200 mm.

Adjacent the flange section 91 is the outer cone section 120. With the tool holder installed, the outer cone section 20 comes into contact with the frustroconical wall section 32 of the spindle head 20 over a large contact area. The contact area is defined as first mounting joint 124. This mounting joint 124 may also be in the form of a cylinder jacket. In the interface area, the abutment surface area 121 of the tool holder 90 abuts the front surface 24 of the spindle head 20 for example also over a large area. The contact area formed thereby is designated the second mounting joint 94.

Here, an engagement surface may be established by point- or line-like contact areas. In the embodiment presented here, the spindle head 20 is provided with the planar front surface 24, whereas the flange section 91 of the tool holder 90 has for example a single contact area. Of course, the point-like contact area may also be arranged on the spindle head 20 and the full abutment surface may be provided on the tool holder 90.

Figure 4:
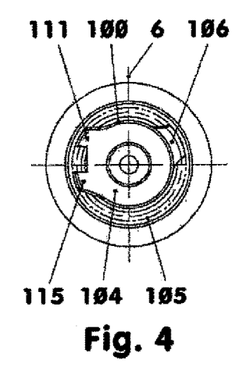
FIG. 4: a bottom view of the tool holder.

Following the outer cone section 120, there is the locking section 101 via the planar abutment surface 121, see FIGS. 2 and 4. The locking section 101 is supported on a base cylinder 103, which has only for example a cylindrical base shape. The base cylinder 103 has for example a length 9 mm and a diameter of 11 mm. It ends in a planar bottom surface 104. The bottom cylinder 103 is provided with a bayonet element 106. A release web 111 and a locking web 115. The heads of the bayonet element 106, the release web 111 and the locking web 115 are disposed on a cylindrical envelope 105, whose diameter is for example 15.2 mm, see FIG. 4. In the area between the outer wall of the base cylinder 103 and the cylindrical envelope 105, there is an imaginary cylinder designated as partial cylinder 70. Its diameter is for example 14 mm.

The partial cylinder 70 is shown in FIGS. 12 to 20 in a developed form as part of the spindle head 20 and of the tool holder 90.

The bayonet element 106 is for example a section of a threaded web whose pitch is for example 6 mm. The bayonet element 106 shown in the exemplary embodiment is part of a rectangular thread. It may also be part of a trapezoidal-, saw-tooth-, round-, metric thread or similar. The bayonet element 106 extends on average over 40 angular degrees of the circumference of the partial cylinder. The web width is 2 mm whereas the web height is 2.1 mm. The gravity center of the bayonet element 106 is spaced 2.5 mm from the bottom surface 104.

The bayonet element 106 may also be in the form of a plate-like web whose axially oriented surfaces are planar, not spiral-like. In this case, the clamping flank 52 would be replaced by a ball-like, for example spherical, curved contact surface.

In accordance with FIG. 4, the release web 111 is arranged displaced in counter clockwise direction by about 120 angular degrees. It has—measured on the partial cylinder 70—an average width of 4.25 mm—its height is 6 mm. The lower front surface of the release web 111 ends at the bottom surface 104. In a top view, see FIG. 2 and FIGS. 12 to 20, the release web 111 has for example a rectangular outer contour.

The locking web 115 is positioned displaced by a further 60 angular degrees in counter-clockwise direction. The locking web 115 has a maximum width of 4.3 mm and a maximum width of 4.3 mm and a maximum height of 3.4 mm. Also, its lower front face area ends at the bottom surface 104, see FIG. 6. The locking web 115 and the release web 111 have two opposite planar side surfaces 116, 112 which form planes that extend in parallel relationship, see also FIG. 6. The side surface 116 of the locking web 115 is spaced leg 1 mm from a longitudinal horizontal center plane 5 whereas the distance between the longitudinal center plane 5 and the side surface 12 of the release web 111 is 2.5 mm. Between the side surfaces 112, 116, there is a planar area 113 which extends parallel to the center line 99 and perpendicularly to the side surfaces 112, 116. It is spaced from the longitudinal center plane 6 by for example 5.6 mm, see FIG. 4.

Figure 6:
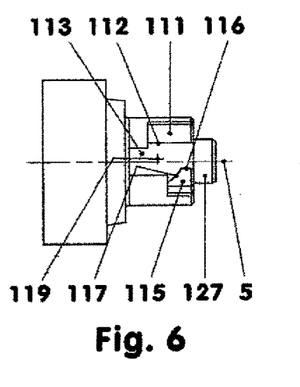
FIG. 6: a side view of the tool holder.

The locking web 115 is provided with a rounded area 117 which has a radius of 3.4 mm. The center line 119 of the rounded area 117, which extends normal to the drawing plan of FIG. 6 is spaced from the bottom surface 104 by 4.7 mm. At the same time, it is disposed by 0.4 mm above the longitudinal, center plane 5.

The end section 127 is an essentially cylindrical section, which is provided at its end with a 0.5×30° fase. Axially between the end section 127 and the bottom surface 29, there is a play of for example 0.2 mm.

Figure 1:
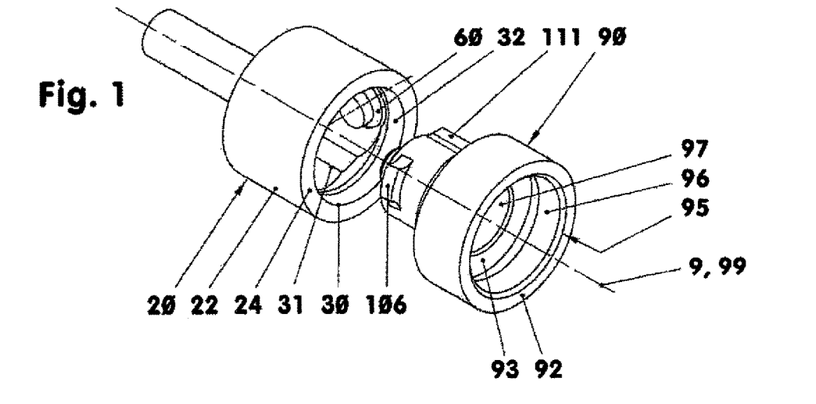
FIG. 1: A perspective view of an interface area of a spindle head and a tool holder.
Figure 20:
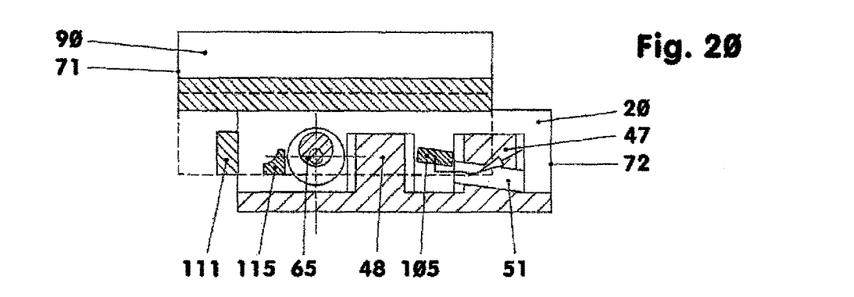
FIG. 20: the radial disengagement and removal of the development of the tool holder from the development of the spindle head.

In the FIGS. 1 and 2, the spindle head 20 and the tool holder 90 are shown in an exploded view. The spindle head 20 and the tool holder 90 are only displaced linearly. A rotation which is required for the separation of the tool holder 90 from the spindle head is not shown. However, the eccentric screw 60 is shown in its open position. The closed position is shown in FIG. 20.

Figure 10:
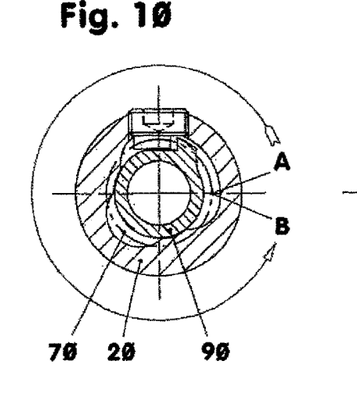
FIG. 10: a transverse cross-sectional view of the interface area of the eccentric screw.
Figure 11:
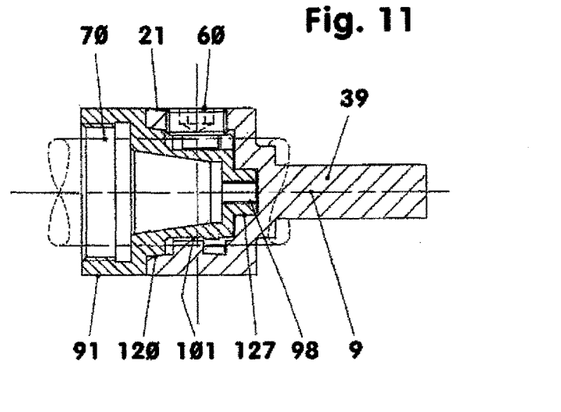
FIG. 11: a longitudinal cross-sectional view of the interface area at the eccentric screw.

The FIGS. 10 and 11 show the interface area formed by the spindle head 20 and the tool holder 90 in a longitudinal and a transverse cross-sectional view. In the cross-sectional view, see FIG. 10, the partial cylinder 70 is shown by a dash-dotted line. The partial cylinder 70 is penetrated by the raised radially inwardly projecting parts of the inner wall 31 of the spindle head 20 and the radially outwardly projecting parts 106, 111, 115 of the tool holder 90.

Viewing from the centerline 9 outwardly through the partial cylinder 70, with this cylindrical representation being developed into a planar picture, a tool holder development is generated. The latter is designated an inner development 71. If, vice-versa, the structure is viewed from the outside toward the center line 9 of the partial cylinder 70 and the cylindrical representation is developed to a planar picture, a spindle development is formed. It is called an outer development 72. The beginning A the end B and the direction of the development 71, 72 are shown in FIGS. 12 and 13.

In FIGS. 12-20, the two development pairs 71, 72 are shown in different positions relative to each other in order to make it possible to describe the establishment of the interface.

Figure 12:
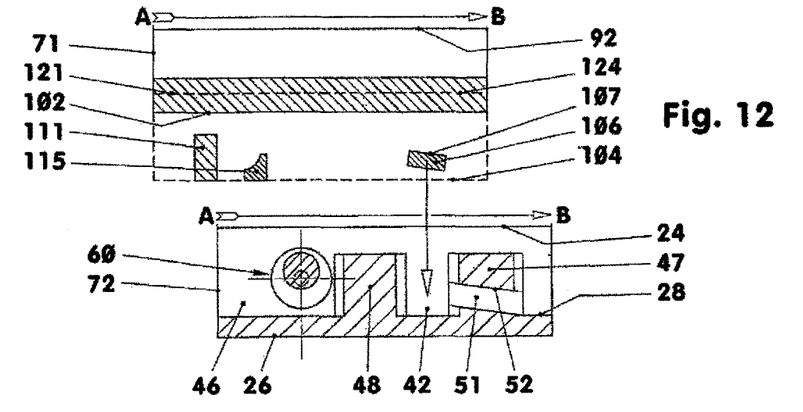
FIG. 12: a development of the tool holder above the development of the spindle head, wherein each of the developments corresponds to the convex surface of a straight cylinder in the interface area.
Figure 13:
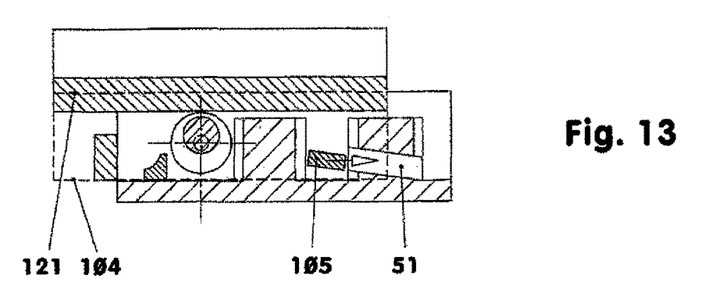
FIG. 13: a development of the tool holder inserted into the development of the spindle head.
Figure 14:
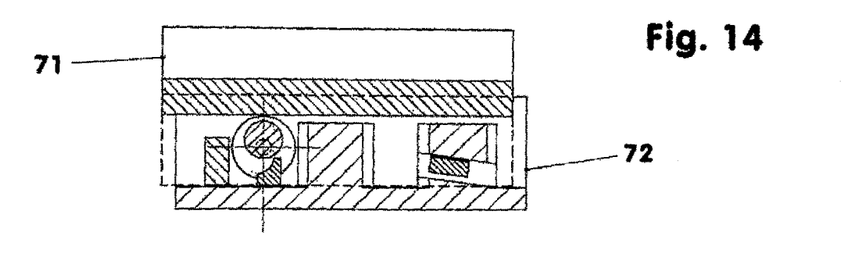
FIG. 14: a development of the tool holder moved sidewardly into the development of the spindle head.

In FIG. 12, the two planar developments 71 and 72 are shown separated from each other. The tool holder 90 is not yet inserted into the spindle head 20. In the development 71 below the hatched mounting joint 124, the release web 111 in section, the closing web 15 and the bayonet element 106 are visible. The parts 115, 111 abut the bottom surface 104 indicated as a line. In the development 72, the eccentric screw 60, the groove web 47 and the blocking web 48 are shown between the outer front surface 24 and the intermediate bottom surface 28. In the groove web 47, there is the holding groove 51 with the clamping flank 52'.

FIG. 12 shows the development 71 positioned in front of the development 72 so that the bayonet element 106 of the development 71 is disposed about in the center ahead of the first cutout 42.

As shown in FIG. 13, the tool holder 90 is moved linearly into the spindle head 20. The rear abutment surface 121 abuts the front surface 24. The bayonet element 106 is now disposed in the first cut-out 42. When now the tool holder 90 is moved in the spindle head 20 to the right, the bayonet element 106 is moved into the holding groove 51, see FIG. 14.

Figure 15:
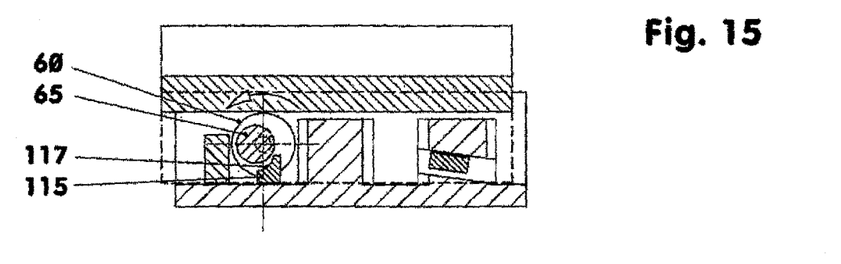
FIG. 15: the sideward pivoting of the eccentric screw.

In FIG. 15, the eccentric screw 60 is turned by 90 angular degrees so that the eccenter pin 65 moves to the left. Since in FIG. 15 the rotation of the eccenter screw 60 is executed from the back, it appears in this figure as counter-clock rotation.

Figure 16:
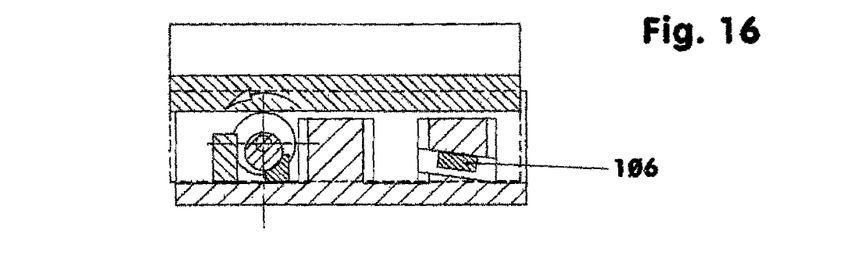
FIG. 16: in the development of the spindle head, the sideward displacement of the development of the tool holder by the pivoting of the eccentric screw.

In FIG. 16, after a further right turn by about 90 angular degrees, the eccenter screw 60 abuts the rounded area 117 of the locking web 115 and, at the same time, moves the bayonet element 106 further into the holding groove 51.

Figure 17:
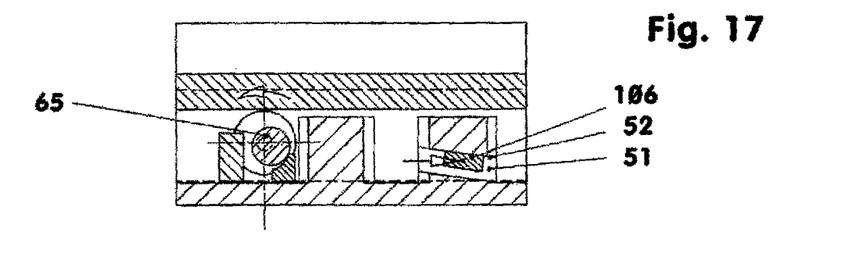
FIG. 17: the clamping of the development of the tool holder by the pivoting of the eccentric screw.

After a further rotation of the eccentric screw 60 by about 45 angular degrees, the bayonet element 106 abuts with its clamping flank 107 the clamping flank 52 of the holding groove 51, see FIG. 17. Now the toolholder 90 is firmly clamped in the spindle head 20 at two points or lines or surfaces which are arranged almost opposite each other. At one hand, the bayonet element 106 disposed in the holding groove 51 pulls the rear abutment surface 121 against the front surface 24 of the spindle head 20. On the other hand, a comparable clamping effect is provided by the abutment of the eccentric pin 65 on the locking web 115.

Figure 18:
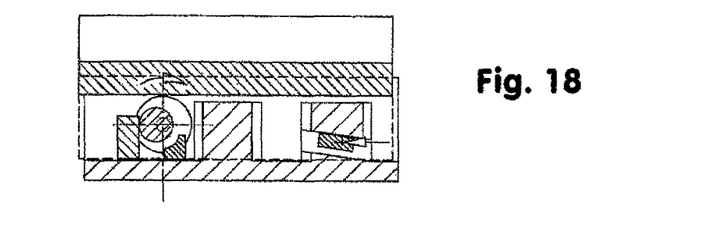
FIG. 18: the outward pivoting of the eccentric screw for the release of the clamping of the developments.
Figure 19:
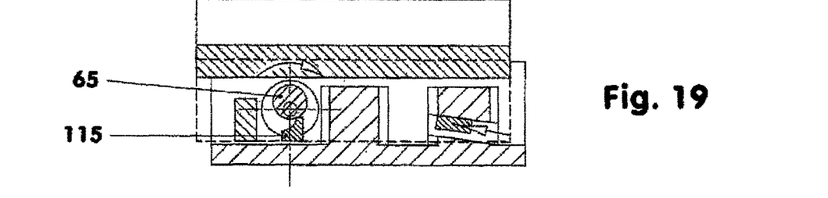
FIG. 19: the radial release and retaining arrangement.

For releasing the tool holder 90, the eccentric screw 60 is moved from the backside with a left turn, see FIG. 18. Here the movement is a clockwise turn. After a turn of about 100 angular degrees, the eccenter pin 65 contacts the release web 111. This result's in a leftward movement of the development 71 whereby the bayonet element 106 is removed from the clamping flank 52 of the holding groove 51.

If now with an axial upward pull, the tool holder 90 is further turned, the closing web 115 abuts for example the fully back-pivoted eccentric pin 65 before the bayonet element 10 has left the holding groove 15 completely. The tool holder 90 is now with play in a holding position, see FIG. 19. If the tool holder 90 would for example be mounted at a higher level in a vertically positioned downwardly open spindle head 20, it would not fall out of the spindle head 20 in spite of the loosening of the clamp.

Only after a further rotation of the tool holder 90 with concurrent axial inward pushing into the spindle head 20, the spindle head 20 can be pulled out of the spindle head 20 see FIG. 20. As soon as the bayonet element 106 is disposed between the two blocking webs 47, 48 also the webs 111 and 115 are disposed between the groove web 47 and the eccentric pin 65. Now the tool holder 90 can easily be removed.

For clamping or coupling the tool holder 90 in the spindle head 20 it is, before insertion, first so positioned that its marker groove 122, see FIG. 21, is arranged opposite the marker groove 57 of the spindle head 20. Subsequently, the tool holder 90 is inserted into the spindle head 20 in a linear movement. As soon as a resistance in axial direction is sensed the tool holder 90 is turned to the right by about 65 to 75 angular degrees, so that the bayonet element 106 is moved into the holding groove 52. Consequently, during clamping, or respectively, coupling at least one of the webs 106, 115 can be brought into abutment with at least one engagement wall of the cavity 30.

In a final step, the eccentric screw 60 is turned by means of a torque wrench by for example 225 angular degrees to the right. As maximum torque for example 10 Nm is selected. During the axial movement, the eccentric pin 65 abuts the closing web 115 and, in the process, turns the tool holder 90 further by several angular degrees or angular minutes. The eccentric pin 65 pushes the bayonet element 106 deeper into the holding groove 52. At the same time, the eccentric pin 65, by its abutment on the closing web 115, pushes the toolholder 90 into the mounting joints 94, 124. Since the fine thread of the eccenter screw 60, because of its large contact area in the thread source and because of its low thread pitch, is self-locking in the bore 49, the eccenter screw 60 remains fixed in position.

The tool holder 90 may also be clamped in the spindle head 20 based on its travel distance- or angular position, see FIGS. 1, 21 and 22. To this end, the eccenter screw 60, whose marker groove 68, see FIGS. 2, 21, 22, is arranged initially ahead of the centerline-parallel marker groove 57 of the spindle head 20, see FIG. 2, is turned to the right in front of the other marker groove 58 of the spindle head 20, see FIG. 21.

The abutment of the tool holder-side end section 127 in the bore 35 of the spindle head 20 with tight tolerance supports additionally a uniform cogging-free abutment of the construction groups 20, 90 in the mounting joints 94 and 124. The tool holder 90 is now engaged in the spindle head 20 without play and with high repetition accurately.

| Reference list | |
|---|---|
| 5 | Horizontal center plane |
| 6 | Longitudinal center plane |
| 9 | Centerline of interface area |
| 10 | Housing of tool unit |
| 11 | Ball journal bearings |
| 12 | Support plate |
| 13 | Cover |
| 15 | Front side |
| 16 | Annular groove |
| 17 | Scaling ring |
| 20 | Spindle head, first construction group |
| 21 | Clamping mechanism section |
| 22 | Outer wall |
| 24 | Front surface abutment surface |
| 25 | Spindle head shoulder |
| 26 | Axial collar, planar, rear |
| 28 | Intermediate bottom surface |
| 29 | Inner bottom surface |
| 30 | Cavity, central |
| 31 | Inner wall |
| 32 | Frustro-conical section |
| 35 | Bore |
| 39 | Shaft |
| 42 | First cut-out |
| 43 | Cylindrical wall |
| 45 | Center line |
| 46 | Second cutout |
| 48 | Blocking web |
| 49 | Threaded bore of the eccentric screw |
| 51 | Holding groove |
| 52 | Clamping flank |
| 53 | Flank, load-free |
| 57 | Marker groove, open position |
| 58 | Marker groove, closed position |
| 59 | Centerline |
| 60 | Eccentric screw, clamping element |

-continued

Reference list

| | |
|---|---|
| 61 | Eccenter shaft with external thread |
| 65 | Eccentric pin |
| 66 | Centerline of 65 |
| 67 | Tool accommodation cavity |
| 68 | Marker groove |
| 69 | Centerline of 60 |
| 70 | Partial cylinder |
| 71 | Development of tool receiver |
| 72 | Development of spindle head |
| 90 | Toolholder, second assembly |
| 91 | Flange section |
| 92 | Front face |
| 93 | Rear surface |
| 94 | Second mounting joint |
| 95 | Clamping plier cavity |
| 96 | Internal thread section |
| 97 | Inner cone section |
| 98 | Threaded throughbore |
| 99 | Centerline |
| 100 | Trunnion |
| 101 | Locking section |
| 102 | Planar front face |
| 103 | Base cylinder |
| 104 | Bottom surface |
| 105 | Cylindrical envelope |
| 106 | Bayonet element web, thread section |
| 107 | Clamping flank of 106 |
| 111 | Release web |
| 112 | Side surface |
| 113 | Planar area between 112 and 116 |
| 115 | locking web |
| 116 | Side surface |
| 117 | Rounded area |
| 119 | Centerline |
| 120 | Outer cone section, truncated cone-shaped |
| 121 | Abutment surface, planar |
| 122 | Marker groove on 91 |
| 124 | First mounting joint |
| 127 | End section, cylindrical bolt |
| 130 | Clamping wrench |
| 137 | Clamping screw ring |
| 138 | Outer thread |
| 139 | Carrier |
| 140 | Tool, spiral drill, for example internally cooled |

What is claimed is:

1. An interface structure comprising a first assembly (20) supporting a tool or a tool holder and a second assembly (90) supporting a machining element, the first assembly (20) having a cavity (30) with at least one frustro-conical shell or cylindrical section (32) and an abutment surface (24) or contact area which is facing axially in the direction of the second assembly (90), and the second assembly (90) having a trunnion (100) with, a cone-, truncated cone- or cylinder-shaped section (120) for abutment on the frustro-conical shell or cylindrical section (32) of the first assembly (20) and with an abutment area (121) which is facing in axial direction toward the first assembly (20) for contacting the abutment surface (24) of the first assembly (20), and the interface structure further including, disposed in the cavity (30), a bayonet-like locking structure with bayonet webs (106, 115) provided on the trunnion (100) and the first assembly (20) including clamping elements (60) whose front ends abut during clamping the bayonet webs (106, 115) provided on the trunnion (100), the clamping elements being in the form of eccentric screws (60) which are provided each with an eccentric pin (65) and are rotatable between a release and a clamping position within a pivot angle of 180 to 270 angular degrees.

2. The interface structure according to claim 1, wherein at least one of the bayonet webs (106, 115) is a threaded section-like bayonet element which has a pitch of 5 to 8 mm and a length covering 10 to 60 angular degrees of the 360 angular degree circumference.

3. The interface structure according to claim 2, wherein the bayonet element (106) has a pitch inclining to the right.

4. The interface structure according to claim 2, wherein the cross-section of the bayonet element (106) is a rectangle, a trapeze or a triangle, wherein, with a trapeze, the longer base side is disposed in the respective trunnion top surface.

5. The interface structure according to claim 1, wherein the trunnion (100) includes a third web (111) in the form of a release web with a flank (12) which, during the release of the second assembly (20), is contacted by the clamping element (60).

6. The interface structure according to claim 1, wherein the distance between the bayonet webs (106) and (115) is smaller than the outer diameter of the eccentric pin (65) of the eccentric screw (60).

7. The interface structure according to claim 1, wherein the rear area of the cavity (30) of the first assembly (20) —for accommodating a cylindrical holt (127) of the second assembly (90) —includes a cylindrical bore (35) with a play between the bolt (127) and the bore (35) of less than 0.1 mm.

8. The interface structure according to claim 1, wherein the first assembly (20) is a spindle head whereas the second assembly group (90) is a tool holder.

* * * * *